United States Patent [19]

Shibuya et al.

[11] Patent Number: 5,576,303
[45] Date of Patent: Nov. 19, 1996

[54] ENERGY-SUPPLEMENTING SACCHARIDE SOURCE AND ITS USES

[75] Inventors: Takashi Shibuya; Toshiyuki Sugimoto; Toshio Miyake, all of Okayama, Japan

[73] Assignee: Kabushiki Kaisha Hayashibara Seibutsu Kagaku Kenkyujo, Okayama, Japan

[21] Appl. No.: 322,528

[22] Filed: Oct. 17, 1994

Related U.S. Application Data

[63] Continuation-in-part of Ser. No. 212,937, Mar. 15, 1994, abandoned.

[30] Foreign Application Priority Data

Mar. 16, 1993 [JP] Japan ......................... 5-93513

[51] Int. Cl.$^6$ ............................ A61K 31/715; A23G 3/00
[52] U.S. Cl. ........................ 514/53; 426/658; 536/123.12
[58] Field of Search ............................... 536/123.13, 102, 536/124; 514/53; 426/48, 658; 435/96, 100

[56] References Cited

U.S. PATENT DOCUMENTS

| | | | |
|---|---|---|---|
| 4,814,436 | 3/1989 | Shibata et al. | 536/17.1 |
| 5,026,566 | 6/1991 | Roser | 426/443 |
| 5,218,096 | 6/1993 | Shibuya et al. | 536/41 |
| 5,319,048 | 6/1994 | Carosino et al. | 527/300 |
| 5,441,644 | 8/1995 | Kinouchi | 210/651 |
| 5,447,856 | 9/1995 | Kizawa et al. | 435/100 |

FOREIGN PATENT DOCUMENTS

| | | |
|---|---|---|
| 0462693 | 12/1991 | European Pat. Off. |
| 0486315 | 5/1992 | European Pat. Off. |
| 0532807 | 3/1993 | European Pat. Off. |
| 0558213 | 9/1993 | European Pat. Off. |
| 0606753 | 7/1994 | European Pat. Off. |
| 2664472 | 1/1992 | France |
| 1369972 | 6/1968 | Japan |
| 4250672 | 6/1968 | Japan |
| 2379983 | 8/1981 | Japan |
| 7259883 | 10/1981 | Japan |
| 240758 | 3/1987 | Japan |
| 9203565 | 3/1992 | WIPO |
| 9207947 | 5/1992 | WIPO |

OTHER PUBLICATIONS

Database WPI, Section Ch, Week 8846; Derwent Publications Ltd., London, GB; Class D13, AN 88-326744; and JP-A-63-240-758 (Norinsho et al), Oct. 6, 1988. (Abstract).

Database WPI, Section Ch, Week 8846; Derwent Publications Ltd., London, GB; Class D13, AN 88-326743; and JP-A-63-240-757 (Norinsho et al), Oct. 6, 1988. (Abstract).

Okada et al.; *Digestion and Fermentation of Pullalan*, Journal of Japanese Society Of Nutrition and Food Science, vol. 43 No. 1, pp. 23–29, 1990.

Atsuji et al.; Journal Of Clinical Nutrition, vol. 41, No. 2, pp. 200–208, 1972.

*Carbohydrates*, Ed. by Peter M. Collins, Publ. by Chapman and Hall, pp. 486–487, (1988).

*Primary Examiner*—John Kight
*Assistant Examiner*—Howard C. Lee
*Attorney, Agent, or Firm*—Browdy and Neimark

[57] ABSTRACT

Trehalose, prepared by allowing a non-reducing saccharide-forming enzyme to act on partial starch hydrolysates exhibiting a reducing power and having a degree of polymerization (DP) of 3–25, is advantageously used as an energy-supplementing saccharide source and used in energy-supplementing compositions as an effective ingredient. The saccharide source and compositions can be suitably used as pharmaceutical compositions for supplementing energy for living bodies without fear of causing side effects.

25 Claims, 6 Drawing Sheets

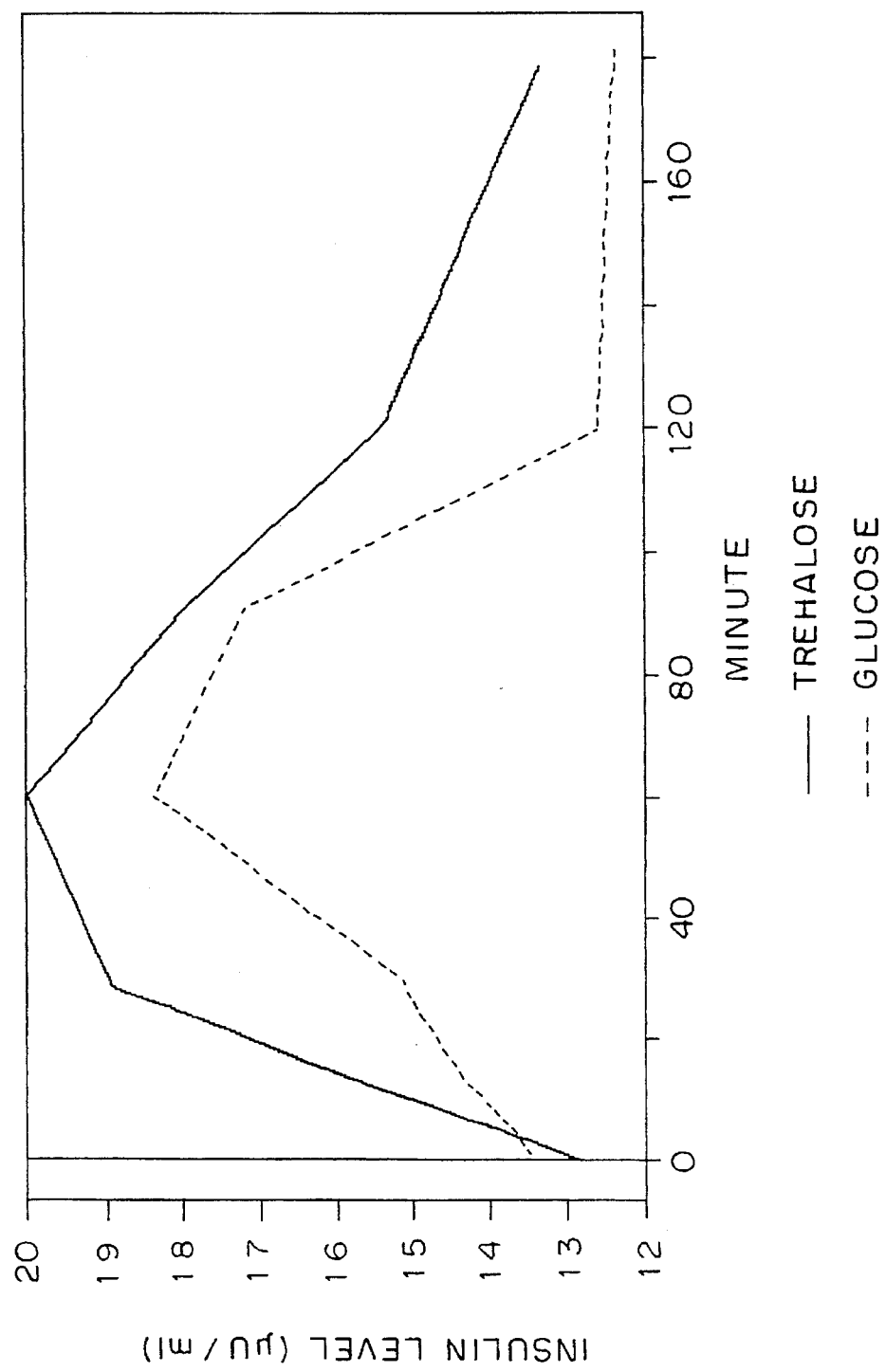

ENERGY-SUPPLEMENTING SACCHARIDE SOURCE AND ITS USES

CROSS REFERENCE TO RELATED APPLICATION

This application is a continuation-in-part of U.S. application Ser. No. 08/212,937, filed Mar. 15, 1994, now abandoned, the content of which is entirely incorporated herein by reference.

BACKGROUND OF THE INVENTION

1. Field of the Invention

The present invention relates to an energy-supplementing saccharide source and uses thereof, more particularly, to an energy-supplementing saccharide source essentially consisting of trehalose prepared by allowing non-reducing saccharide-forming enzyme to act on partial starch hydrolysates exhibiting a reducing power, hereinafter sometimes referred to as α,α-trehalose and to an energy-supplementing composition containing said trehalose as effective ingredient.

2. Description of the Prior Art

Reducing saccharides such as glucose and fructose have been used for a long time as energy-supplementing saccharide source. The reducing saccharides, however, have a relatively-poor storage stability because of their reducing power, and, generally they become more unstable in coexistence with other nutritives such as amino acids and vitamins.

Therefore, the realization of an energy-supplementing saccharide source essentially consisting of a non-reducing saccharide such as xylitol, sorbitol, maltitol, lactitol, sucrose or trehalose has been in great demand. Among these non-reducing saccharides, monosaccharide alcohols such as xylitol and sorbitol have the disadvantage that they may cause serious diarrhea when administered to the body with an improper dose or route of administration. Disaccharide alcohols such as maltitol and lactitol, as disclosed in Japanese Patent Publication Nos. 13,699/72 and 42,506/72, are not readily metabolized and utilized by living bodies, and actually have been used as a diet sweetener. Thus, the disaccharide alcohols are not satisfactory as an energy-supplementing saccharide source. Sucrose has the disadvantage that it is readily hydrolyzed the into sugars glucose and fructose under acidic conditions, thus exibiting poor storage stability. As evident from the descriptions of "Trehalose is low caloric because it is not substantially assimilated and utilized by the body." and "Trehalose is not substantially hydrolyzed by amylases, etc.", as disclosed in Japanese Patent Laid-Open No. 240,758/88, trehalose has been recognized as saccharide source which does not act as an energy source in vivo.

SUMMARY OF THE INVENTION

In view of the foregoing, the development of an energy-supplementing saccharide source has been desired which is readily prepared on an industrial scale and does not substantially exhibit reducing power but has satisfiable storage stability and extensive applicability. An energy-supplement composition containing such an energy-supplementing saccharide source as an effective ingredient has been in great demand.

The present inventors have studied energy-supplementing saccharide sources which are readily prepared on an industrial scale. More particularly, we energetically researched a non-reducing and stable disaccharide, i.e. trehalose, as well as its related substances. As a result, we found that trehalose (O-α-D-glucopyranosyl α-D-glucopyranoside or α,α-trehalose), prepared by a novel biochemical technique as disclosed in Japanese Patent Application Nos. 362,131/92 and 265,416/93, both of which were applied for by the present inventors, is readily metabolized in vivo and utilized by living bodies as an energy source. We also found that such a biochemical technique facilitates an industrial-scale preparation of trehalose, and it contains a step of allowing non-reducing saccharide-forming enzyme to act on partial starch hydrolysates exhibiting a reducing power (the wording "partial starch hydrolysate exhibiting a reducing power" is designated as "reducing partial starch hydrolysate" hereinafter). We further found that the trehalose prepared by the biochemical technique is an absolutely novel energy-supplementing saccharide source with extensive applicability because of its non-reducing property, and established an energy-supplementing composition containing said trehalose as an effective ingredient. The energy-supplementing composition according to the present invention can be arbitrary used in combination with other nutritives and/or medicaments, and formed into and multi-nutrient compositions and pharmaceutical compositions which exert improved therapeutic efficacy because the trehalose incorporated therein has a satisfactorily-high storage stability and does not substantially exhibit a reducing power.

BRIEF DESCRIPTION OF THE ACCOMPANYING DRAWINGS

FIG. 6 shows the time course for insulin level as found in rabbit which received a slow parenteral administration of trehalose or glucose.

Figure 1:
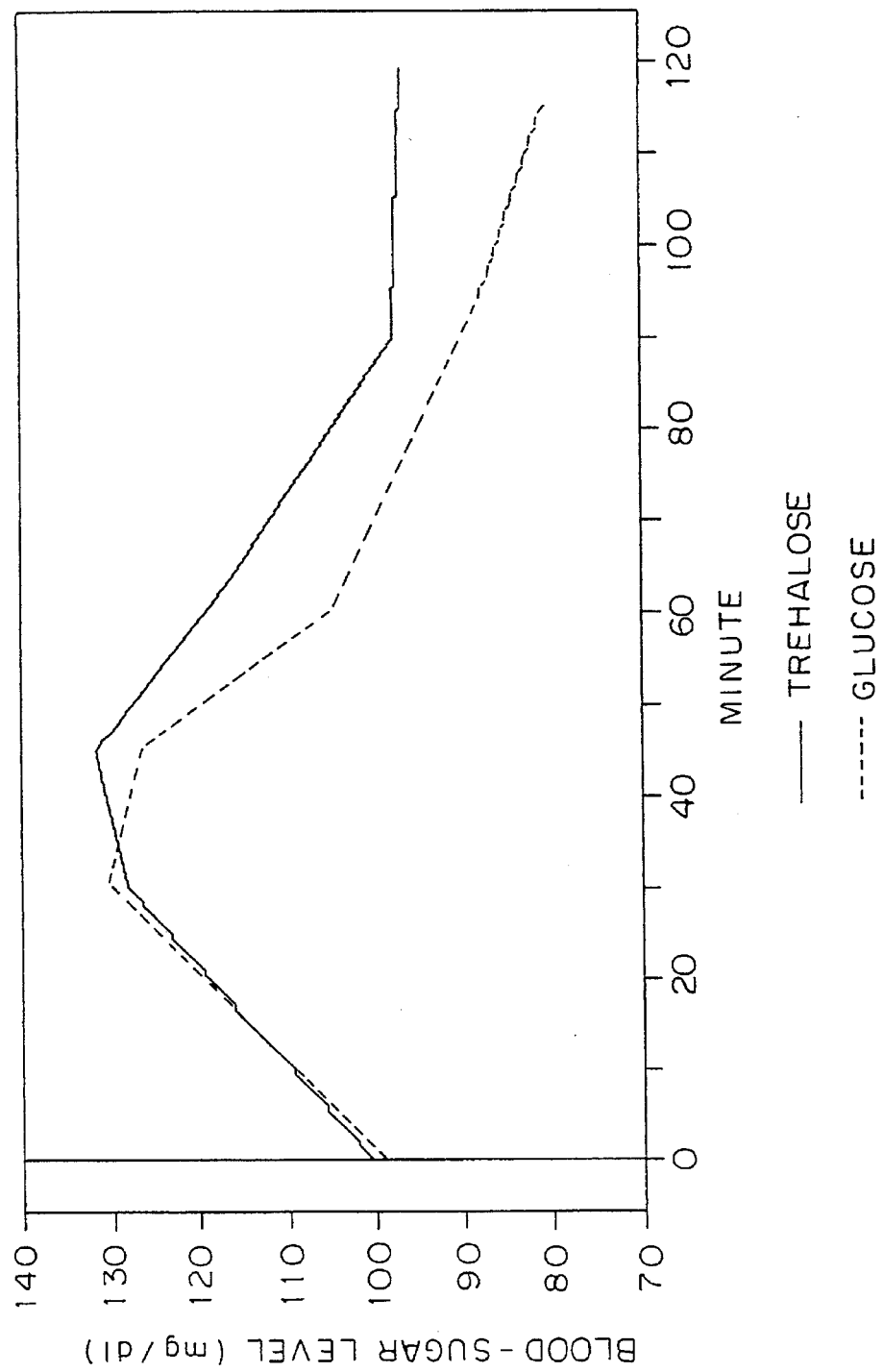
FIG. 1 shows the time course for blood-sugar level as found in human volunteers who received an oral administration of trehalose or glucose.

In all the figures, the solid lines show the dynamics of trehalose, and the dashed lines mean those of glucose.

DETAILED DESCRIPTION OF THE INVENTION

The present invention relates to an energy-supplementing saccharide source and uses thereof, more particularly to an energy-supplementing saccharide source essentially consisting of α,α-trehalose prepared by allowing non-reducing saccharide-forming enzyme to act on reducing partial starch hydrolysates, and to an energy-supplementing composition containing said trehalose as effective ingredient.

The present energy-supplementing saccharide source essentially consisting of trehalose prepared by allowing non-reducing saccharide-forming enzyme to act on reducing partial starch hydrolysates, and the present energy-supplementing composition containing said trehalose as effective ingredient have never been reported.

Suitable energy-supplementing saccharide source used in the present invention are those which have the highest possible trehalose content. They are usually in the form of a syrup or a powder with a trehalose content of 50 w/w % or higher, on a dry solid basis (the wordings "w/w %" and "on a dry solid basis" are respectively abbreviated as "%" and "d.s.b." in the specification, unless otherwise specified), preferably in the form of a syrup or a crystalline powder with a trehalose content of 80% or higher, d.s.b., more preferably in the form of a crystalline powder or a crystal with a trehalose content of 90% or higher, d.s.b.

Non-reducing saccharide-forming enzymes which are usable in the invention are obtainable by cultivating in nutrient culture media microorganisms capable of producing such an enzyme, and collecting the resultant enzymes. Examples of such a microorganism are *Rhizobium sp.* M-11 (FERM BP-4130), *Arthrobacter sp.* Q36 (FERM BP-4316), *Brevibacterium helovolum* (ATCC 11822), *Flavobacterium aquatitle* (IFO 3772), *Micrococcus luteus* (IFO 3064), *Micrococcus roseus* (ATCC 186), *Curtobacterium citreum* (IFO 15231), *Mycobacterium smegmatis* (ATCC 19420), *Terrabacter tumescens* (IFO 12960), and their mutants.

Any nutrient culture media can be used in the invention as long as they permit the aforesaid microorganisms to grow and produce the objective non-reducing saccharide-forming enzymes. Cultivations of such a microorganism are carried out with synthetic- and natural-nutrient culture media which contain carbon sources, nitrogen sources, inorganic ingredients, etc. Any carbon-containing substance can be used in such a cultivation as carbon source as long as it can be utilized by the microorganisms. Examples of such a carbon source are saccharides such as glucose, fructose, lactose, sucrose, mannitol, sorbitol, molasses and reducing partial starch hydrolysates; and organic acids such as citric acid and succinic acid can be used as the carbon source. The concentration of carbon sources in nutrient culture media is arbitrarily chosen depending on the carbon sources used. For example, a preferable growth of microorganisms is attained when cultivated in media containing 20 w/v % or less, more particularly, 5 w/v % or less of reducing partial starch hydrolysates. The nitrogen sources usable in the invention are, for example, inorganic nitrogen compounds such as ammonium salts and nitrates; and organic nitrogen-containing substances such as urea, corn steep liquor, casein, peptone, yeast extract and beef extract. The inorganic ingredients usable in the invention are, for example, calcium salts, magnesium salts, potassium salts, sodium salts, phosphates and other salts of manganese, zinc, iron, copper, molybdenum and cobalt. If necessary, amino acids and vitamins can be suitably used in combination.

The microorganisms feasible in such a cultivation are cultivated under aerobic conditions at a temperature, usually in the range of 4°–40° C., preferably a temperature of 20°–37° C.; and at a pH in the range of 4–10, preferably a pH of 5–9. The cultivation time used in the invention is set longer than that required for the growth initiation of the microorganisms, in particular 10–100 hours. The concentration for dissolved oxygen (DO) in nutrient culture media is not specifically restricted, but usually in the range of 0.5–20 ppm. To keep the concentration for DO within such range, one can control aeration, stirring and/or aeration while supplementing oxygen, and/or increase the pressure in fermenters. The cultivation is carried out batchwise or in continuous manner.

After completion of the cultivation, a non-reducing saccharide-forming enzyme is recovered. Inasmuch as the activity of the enzyme is present in both cells and cell-free supernatants, these cells and supernatants can be used as crude enzyme. The resultant culture can be also used intact as crude enzyme. Conventional liquid-solid separation methods can be employed in the invention to remove cells from the culture. For example, methods to directly centrifuge the resultant culture, as well as those to filtrate the culture with precoat filters or to separate cells by membrane filtration using plane filters or hollow fibers, can be suitably used. Although cell-free filtrates thus obtained can be used intact as enzyme solutions, they may be concentrated prior to their use. Such a concentration method usable in the invention is, for example, salting out using ammonium sulfate, sedimentation using acetone and alcohol, and concentration using membranes such as plane filters and hollow fibers.

Cell-free filtrates and their concentrates can be subjected to conventional immobilization methods. Examples of such an immobilization method are conjugation methods using ion exchangers, covalent bondings and absorptions using resins and membranes, and inclusion methods using substances with a relatively-high molecular weight. Cells separated from the resultant cultures can be used as crude enzyme with no special treatment, or they can be immobilized prior to use. For example, such cells can be immobilized by mixing them with sodium alginate, and dropping the resultant mixture in calcium chloride solution to gelatinize the drops into granules. The granules thus obtained may be fixed by treating them with polyethyleneimine or glutaraldehyde. Extracts from cells can be used in the invention as crude enzyme solution. For example, clear crude enzyme solutions containing a non-reducing saccharide-forming enzyme can be prepared by extracting the enzyme from cells treated with ultrasonic, mechanical disruption using glass beads and alumina, and french-press disruption; and subjecting the resultant extract to centrifugation or membrane filtration.

The crude enzyme solutions thus obtained can be used intact or after purification in conventional manner. For example, a purified enzyme preparation exhibiting a single band on electrophoresis can be prepared by dialyzing a crude enzyme preparation which had been prepared by salting out a crude enzyme solution with ammonium sulfate, concentrating the resultant, and further successively purifying the dialyzed solution on anion-exchange column chromatography using "DEAE Toyopearl®", an anion-exchange resin hydrophobic column chromatography using "Butyl Toyopearl®", a hydrophobic resin; and gel filtration chromatography using "Toyopearl® HW-55", a resin for gel filtration, all of which are products of Tosoh Corporation, Tokyo, Japan.

As an example of the non-reducing saccharide-forming enzymes usable in the invention, those derived from microorganisms of the species *Rhizobium sp.* M-11 (FERM BP-4130) which has been deposited on Dec. 24, 1992, in Fermentation Research Institute, Agency of Industrial Science and Technology, Ibaraki, Japan, and *Arthrobacter sp.* Q36 (FERM BP-4316) which has been deposited on Jun. 3, 1993, in National Institute of Bioscience and Human-Technology Agency of Industrial Science and Technology, Ibaraki, Japan, have the following physicochemical properties:

(1) Action

Forming non-reducing saccharides having a trehalose structure as end unit when allowed to act on one or more reducing partial starch hydrolysates having a degree of glucose polymerization (DP) of 3 to 25;

(2) Molecular weight
  About 76,000–87,000 daltons on sodium dodecylsulfate-polyacrylamide gel electrophoresis (SDS-PAGE);
(3) Isoelectric point (pI)
  About 3.6–4.6 on isoelectrophoresis using ampholyte;
(4) Optimum temperature
  About 35°–40° C. when incubated at pH 7.0 for 60 min;
(5) Optimum pH
  About 6.4–7.2 when incubated at 40° C. for 60 min;
(6) Thermal stability
  Stable up to a temperature of about 35°–40° C. when incubated at pH 7.0 for 60 min; and
(7) pH Stability
  Stable at a pH in the range of about 5.5–11.0 when incubated at 25° C. for 16 hours.

The activity of the non-reducing saccharide-forming enzyme is assayed as follows: One ml of an enzyme solution is added to 4 ml of 1.25 w/v % maltopentaose in 50 mM phosphate buffer (pH 7.0), and the mixture solution is incubated at 40° C. for 60 min. The reaction mixture is then heated at 100° C. for 10 min to terminate the enzymatic reaction, and the reaction mixture is precisely diluted by 10 times with deionized water, followed by determining the reducing power of the diluted solution by the Somogyi-Nelson method. As a control, an enzyme solution, which had been heated at 100° C. for 10 min to inactivate the enzyme, is treated similarly as above. One unit of the present enzyme activity is defined as the amount of enzyme which eliminates the reducing power of one micromole of maltopentaose per minute.

Reducing partial starch hydrolysates which are feasible as substrate for the enzyme can be obtained by partially hydrolyzing amylaceous substances such as starch, amylopectin and amylose by amylases or acids. Reducing partial starch hydrolysates obtained by hydrolysis with amylases include those having linear and branched chain-structures prepared by hydrolyzing amylaceous substances with amylases such as α-amylase, maltotriose forming amylase, maltotetraose forming amylase, maltopentaose forming amylase and maltohexaose forming amylase as disclosed in *Handbook of Amylases and Related Enzymes*, published by Pergamon Press, Tokyo, Japan (1988). In the case of preparing the reducing partial starch hydrolysates, debranching enzymes such as pullulanase and isoamylase can be favorably used in combination with the amylases. One or more maltooligosaccharides such as maltotriose, maltotetraose, maltopentaose, maltohexaose and maltoheptaose can be arbitrary used as reducing partial starch hydrolysate.

The present invention provides no special limitation in concentration for reducing partial starch hydrolysates having a DP of 3–25 which are used as substrate. Although the enzymatic reaction proceeds even at a concentration of 0.1 w/v % substrate, more favorably it proceeds at a concentration of 2 w/v % or higher, more preferably at a concentration of 5–50 w/v % substrate. Under these wide range of concentrations, non-reducing saccharides having a trehalose structure are readily formed in a satisfactorily-high yield. Suspensions containing insoluble substrates can be used in the invention. The reaction temperature during enzymatic reactions can be set to a temperature at which the present enzyme is not inactivated, i.e. a temperature up to about 55° C., preferably a temperature of 40°–50° C. The reaction pH during enzymatic reactions is controlled in the range of 5–10, preferably a pH of about 6–8. The reaction time during enzymatic reactions is adequately chosen depending on particular conditions of the enzymatic reaction.

Trehalose obtained by the enzymatic reactions can be prepared into a hydrous crystalline trehalose if necessary: An about 65–90 w/v % solution of trehalose with a purity of about 60 w/v % or higher is placed in a crystallizer, and gradually cooled while stirring in the presence of 0.1–20 w/v % seed crystal at a temperature of 95° C. or lower, preferably at a temperature in the range of 10°–90° C., to obtain a massecuite containing hydrous crystalline trehalose. Conventional methods such as separation method, block pulverization, fluidized-bed granulation and spray drying method can be employed in the invention to prepare, from the massecuite, hydrous crystalline α,α-trehalose or crystalline saccharide mixtures containing the same.

In case of use of the separation method, massecuites are usually subjected to a basket-type centrifuge to separate hydrous crystalline trehalose from the mother liquor, and if necessary the hydrous crystalline trehalose is washed by spraying it with a small amount of cold water to facilitate the preparation of hydrous crystalline trehalose with an increased purity. In the case of the spray drying method, crystalline saccharides with no, or substantially free of, hygroscopicity are readily prepared by spraying massecuites with a concentration of 70–85% saccharides d.s.b., and a crystallinity of about 20–60%, d.s.b., from a nozzle by a high-pressure pump; drying the resultant products with hot air at a temperature of about 60°–100° C. which does not melt the resultant crystalline powders; and aging the resultant powders for about 1–20 hours while blowing thereto a hot air at a tempature of about 30°–60° C. In the case of block pulverization, crystalline saccharides with no, or substantially free of, hygroscopicity are readily prepared by allowing massecuites with a moisture content of 10–20% and a crystallinity of about 10–60%, d.s.b., to stand for about 0.1–3 days in order to crystallize and solidify the whole contents into blocks; and pulverizing or cutting the resultant blocks.

Although anhydrous crystalline trehalose can be prepared by drying hydrous crystalline trehalose to convert it into an anhydrous one, the anhydrous crystalline product is generally prepared by providing a high trehalose content solution with a moisture content less than 10%; placing the solution in a crystallizer; keeping the solution in the presence of a seed crystal at a temperature in the range of 50°–160° C., preferably, a temperature in the range of 80°–140° C. under stirring conditions to obtain a massecuite containing anhydrous crystalline trehalose; and crystallizing and pulverizing anhydrous crystalline trehalose by conventional methods such as block pulverization, fluidized-bed granulation and spray drying.

Any process of producing α,α-trehalose can be used in the invention as long as it contains a step of allowing non-reducing saccharide-forming enzymes to act on reducing partial starch hydrolysates: For example, preparations as disclosed in Japanese Patent Application Nos. 362,131/92 and 265,416/93, wherein trehalose is prepared by allowing non-reducing saccharide-forming enzymes to act on reducing partial starch hydrolysates having a DP 3 or higher, are suitably and advantageously employed in the invention because they facilitate an industrial-scale preparation of trehalose.

The saccharide solutions prepared by the aforementioned processes usually contain about 20–80 w/v % trehalose together with reducing saccharides such as glucose, maltose and maltotriose, etc.

Such a saccharide solution can be prepared in the usual manner into syrupy products by removing impurities in the solutions by gel filtration and centrifugation, purifying the resultant solutions by successive decolorization with activated charcoal and desalting with ion exchangers in H- and OH-form, and concentrating the resultant purified solutions. The syrupy products can be dried into powdery products. If necessary, products containing trehalose with the highest possible purity can be readily prepared by the combination of two or more of purifications, for example, column chromatographic fractionations such as ion-exchange column chromatography and column chromatography using activated charcoal or silica gel, fractionation using organic solvents such as alcohols or acetone, separation using membranes having an adequate separability, and other methods to decompose and remove the remaining reducing saccharides by alkali-treatment or fermentation using yeasts.

More particularly, ion-exchange column chromatography is suitably used in the present invention as industrial-scale preparation of trehalose with the highest possible purity, for example, the trehalose content in material trehalose solutions can be readily improved by removing impurities in the solutions on column chromatography using strong acidic cation exchange resins as disclosed in Japanese Patent Laid-Open Nos. 23,799/83 and 72,598/83. Such column chromatography can be carried out in fixed bed-, moving bed- and pseudomoving bed-methods.

Any energy-supplementing composition can be used in the present invention as long as it contains as effective ingredient the aforementioned in vivo-metabolizable $\alpha,\alpha$-trehalose, which is preparable by allowing non-reducing saccharide-forming enzymes to act on reducing partial starch hydrolysates, and can supplement energy to living bodies. In general, in order to attain a more satisfiable effect, such trehalose is incorporated in the composition in an amount of 10% or higher, preferably 20% or higher, d.s.b.

The present energy-supplementing composition includes those which contain trehalose alone or in combination with one or more edible substances and other substances administrable to living bodies, for example, medicaments such as proteins, amino acids, lipids, saccharides excluding trehalose, vitamins, minerals, antiseptics, enzymes, hormones and cytokines. If necessary, one or more other appropriate substances such as taste-imparting agent, coloring agent, flavor-imparting agent, stabilizer, filler and excipient can be arbitrarily incorporated. The compositions thus obtained can be prepared into forms which meet to particular admixtures.

The compositions can be orally and parenterally administered to living bodies, followed by readily being metabolized and utilized in vivo as energy-supplementing substance without a fear of causing toxicity and side effects.

The dose of the present energy-supplementing saccharide source can be appropriately chosen from a dose in the range of about 1–1,000 g/day/adult, preferably in the range of about 5–500 g/day/adult for trehalose, d.s.b.

The present energy-supplementing saccharide source and composition containing the same can be favorably administered to human, domestic animals such as cows and horses, and pet animals such as dogs and cats, etc.

The following experiments explain the present invention in detail:

EXPERIMENT 1

Preparation of Non-Reducing Saccharide-Forming Enzyme

EXPERIMENT 1-1

Non-Reducing Saccharide-Forming Enzyme derived from *Rhizobium sp.* M-11

In accordance with the method as disclosed in Japanese Patent Application No. 362,131/92, a seed culture of *Rhizobium sp.* M-11 (FERM BP-4130) was inoculated in a nutrient culture medium consisting of 2.0 w/v % maltose, 0.5 w/v % peptone, 0.1 w/v % yeast extract, 0.1 w/v % sodium diphosphate, 0.1 w/v % potassium monophosphate and water, and incubated at 27° C. for 36 hours under aeration-agitation conditions. After completion of the culture, the resultant culture was subjected to membrane filtration using an SF-membrane to remove cells to obtain an about 18 L filtrate which was then concentrated with a UF-membrane to obtain about one L of a solution having an activity of 17.7 units/ml of a non-reducing saccharide-forming enzyme.

EXPERIMENT 1-2

Purification of Enzyme

An about 18 L of the culture obtained in Experiment 1-1 was treated with "Mini-Rabo", a supper high-pressure cell disrupting apparatus commercialized by Dainippon Pharmaceutical Co., Ltd., Tokyo, Japan, to disrupt cells. The resultant mixture was centrifuged at 10,000 rpm for 30 minutes to obtain an about 16 L supernatant. To the supernatant was added ammonium sulfate and dissolved to give a saturation degree of 0.2, and the resultant solution was allowed to stand at 4° C. for one hour, and centrifuged at 10,000 rmp for 30 min to obtain a supernatant.

Ammonium sulfate was dissolved in the supernatant to give a saturation degree of 0.6, and the resultant solution was centrifuged at 10,000 rpm for 30 min to obtain a precipitate. The resultant precipitate was dissolved in 10 mM phosphate buffer (pH 7.0), and the resultant solution was dialyzed against a fresh preparation of the same phosphate buffer for 24 hours, and centrifuged at 10,000 rpm for 30 min to remove insoluble substances. Three hundred and sixty ml of the resultant dialyzed solution was divided into 2 portions which were then separately subjected to column chromatography using a column packed with 300 ml of "DEAE-Toyopearl®", an ion exchanger commercialized by Tosoh Corporation, Tokyo, Japan.

The objective enzyme was adsorbed on the ion exchanger, and eluted from the column with a fresh preparation of the same phosphate buffer supplemented with salt. The resultant fractions having the objective enzyme activity were pooled, and dialyzed against a fresh preparation of the same phosphate buffer supplemented with 2M ammonium sulfate. The dialyzed solution thus obtained was centrifuged at 10,000 rpm for 30 min to remove insoluble substances, and the resultant supernatant was subjected to hydrophobic column chromatography using a column packed with 300 ml of "Butyl-Toyopearl®650", a hydrophobic gel commercialized by Tosoh Corporation, Tokyo, Japan. The enzyme adsorbed on the gel was eluted from the column with a liner gradient buffer from 2M to 0M, followed by recovering fractions with the enzyme activity. The resultant fractions were subjected to gel filtration chromatography using "Toyopearl®HW-55", a resin for gel chromatography commercialized by Tosoh Corporation, Tokyo, Japan, followed by recovering fractions with the enzyme activity. The enzyme activity, specific activity and yield in each purification step are as shown in Table 1.

TABLE 1

| Purification step | Enzyme activity (unit) | Specific activity (units/mg protein) | Yield (%) |
|---|---|---|---|
| Culture | 26,800 | | 100 |
| Supernatant after cell disruption | 20,300 | 0.10 | 76 |
| Dialyzed solution after salting out with ammonium sulfate | 16,100 | 0.32 | 60 |
| Eluate from ion-exchange column | 11,300 | 5.5 | 42 |
| Eluate from hydrophobic column | 5,730 | 98 | 21 |
| Eluate from gel filtration column | 3,890 | 195 | 15 |

A purified enzyme preparation, obtained as eluate from gel filtration column in Table 1, was determined for purity on electrophoresis in a 7.5% polyacrylamide gel. A single protein band was observed revealing that the preparation was an electrophoretically homogeneous enzyme with a relatively-high purity.

EXPERIMENT 1-3

Property of Enzyme

The purified enzyme preparation obtained in Experiment 1-2 was subjected to electrophoresis using 10% sodium dodecylsulfate polyacrylamide gel, and this revealed that the molecular weight was about 77,000–87,000 daltons in comparison with those of marker proteins commercialized by Japan Bio-Rad Laboratories, Tokyo, Japan.

The purified enzyme preparation was subjected to isoelectrophoresis using polyacrylamide gel containing 2 v/v % "Ampholine", an ampholyte commercialized by Pharmacia LKB Biotechnology AB, Uppsala, Sweden. The resultant gel was sliced into pieces, and a gel piece containing the enzyme was used for pH determination and revealed that the enzyme has a pI of about 3.6–4.6.

Effects of temperature and pH on the enzyme were studied in accordance with the assay as used for the enzyme activity. The optimum temperature of the enzyme was about 40° C. when reacted at pH 7.0 for 60 min, and the optimum pH was about 7.0 when reacted at 40° C. for 60 min. The thermal stability of the enzyme was determined by incubating it in 50 mM phosphate buffers (pH 7.0) at different temperatures for 60 min, cooling the buffers, and assaying the remaining enzyme activity in each buffer. The pH stability of the enzyme was determined by incubating it in 50 mM phosphate buffers having different pHs at 25° C. for 16 hours, adjusting the buffers to pH 7, and assaying the remaining enzyme activity in each buffer. The enzyme was stable up to a temperature of about 40° C. and at a pH of about 6–9.

EXPERIMENT 2

Preparation of Non-Reducing Saccharide-Forming Enzyme

EXPERIMENT 2-1

Non-Reducing Saccharide-Forming Enzyme Derived from *Arthrobacter sp.* Q36

Similarly as in Experiment 1-1, a seed culture of *Arthrobacter sp.* Q36 (FERM BP-4316) was cultured by a fermentor for about 72 hours in place of *Rhizobium sp.* M-11 (FERM BP-4130). The enzymatic activity of a non-reducing saccharide-forming enzyme in the resultant culture was about 1.2 units/ml. Similarly as in Experiment 1-1, a cell suspension and a supernatant, prepared from the resultant culture, were assayed their activities to give about 0.5 units/ml and about 0.7 units/ml respectively.

EXPERIMENT 2-2

Purification of Enzyme

By using an about 18 L of the resultant culture obtained by the method in Experiment 2-1, the resultant non-reducing saccharide-forming enzyme was purified similarly as in Experiment 1-2. The results in each purification step were tabulated in Table 2.

TABLE 2

| Purification step | Enzyme* activity (unit) | Specific activity (units/mg protein) | Yield (%) |
|---|---|---|---|
| Culture | 21,600 | | 100 |
| Supernatant after cell disruption | 17,500 | 0.14 | 81 |
| Dialyzed solution after salting out with ammonium sulfate | 15,700 | 0.41 | 73 |
| Eluate from ion-exchange column | 12,600 | 6.5 | 58 |
| Eluate from hydrophobic column | 8,820 | 98 | 41 |
| Eluate from gel filtration column | 5,290 | 201 | 24 |

Note:
The symbol "*" means a non-reducing saccharide-forming enzyme.

A purified enzyme preparation, obtained as the eluate from gel filtration column in Table 2, was studied on its purity on electrophoresis similarly as in Experiment 1-2 to reveal a single protein band, and this showed that the enzyme preparation was a relatively-high purity enzyme having an electrophoretically single band.

EXPERIMENT 2-3

Property of Enzyme

The purified enzyme preparation obtained in Experiment 2-1 was determined its molecular weight on SDS-PAGE to give about 76,000–86,000 daltons. The pI of the enzyme preparation was determined on isoelectrophoresis similarly as in Experiment 1-3 to give a pI of about 3.6–4.6. The effects of temperature and pH on the enzyme preparation, and the thermal stability and pH stability thereof were studied similarly as in Experiment 1-3.

The optimum temperature of the enzyme preparation is about 40° C. and the optimum pH was about 6.5–7.0. The thermal stability was up to about 40° C. and the pH stability was about 6.0–9.5.

EXPERIMENT 3

Preparation and Property of Non-Reducing Saccharide-Forming Derived Enzyme from Other Microorganisms Among known microorganisms the microorganisms as listed in Table 3, which had been confirmed to produce the present non-reducing saccharide-forming enzyme, were cultured by a fermentor at 27° C. for 72 hours similarly as in Experiment 1-1 except that a microorganism of *Mycobacterium smegmatis* (ATCC 19420) was cultured at 37° C. Eighteen L of each resultant culture was subjected to a cell disrupting apparatus, and the resultant supernatant was salted out with ammonium sulfate, dialyzed, and subjected to an ion-exchange column to obtain a partially purified enzyme preparation, followed by studying its properties.

The results were tabulated in Table 3.

C., gradually cooled to 25° C. under gentle stirring conditions, and separated by a basket-type centrifuge. The resultant crystals were washed by spraying with a small amount of water to obtain a high-purity hydrous crystalline trehalose with a purity of 99% or higher, d.s.b.

TABLE 3

| Microorganism | Enzyme activity in eluate from ion-exchange column (Unit) | Optimum temperature (°C.) | Optimum pH (°C.) | Thermal stability | pH Stability |
| --- | --- | --- | --- | --- | --- |
| *Brevibacterium helovolum* (ATCC 11822) | 2,700 | About 35 | About 6.5 | Up to about 35 | About 5.5–11.0 |
| *Flavobacterium aquatile* (IFO 3772) | 216 | About 35 | About 6.5–6.9 | Up to about 35 | About 6.0–9.5 |
| *Micrococcus luteus* (IFO 3064) | 1,730 | About 35 | About 6.4–6.8 | Up to about 35 | About 6.5–8.0 |
| *Micrococcus roseus* (ATCC 186) | 1,340 | About 35 | About 6.8–7.2 | Up to about 35 | About 6.0–11.0 |
| *Curtobacterium citreum* (IFO 15231) | 1,290 | About 30 | About 6.4–6.8 | Up to about 35 | About 6.5–7.8 |
| *Mycobacterium smegmatis* (ATCC 19420) | 358 | About 35 | About 6.5 | Up to about 35 | About 6.0–9.0 |
| *Terrabacter tumescens* (IFO 12960) | 1,050 | About 35 | About 6.5–7.0 | Up to about 35 | About 6.0–9.5 |
| *Rhizobium* sp. M-11 (FERM BP-4130) | 11,300 | About 40 | About 7.0 | Up to about 40 | About 6.0–9.0 |
| *Arthrobacter* sp. Q36 (FERM BP-4316) | 12,600 | About 40 | About 6.5–7.0 | Up to about 40 | About 6.0–9.5 |

EXPERIMENT 4

Preparation of Hydrous Crystalline Trehalose

Forty parts by weight of "PINE-DEX #4", a reducing partial starch hydrolysate having an average dextrose equivalent (DE) of 19±1 and an average DP of about 5, prepared by hydrolysing starch, purifying and pulverizing the resultant, available from Matsutani Chemical Ind., Co., Ltd., Kyoto, Japan, was dissolved by heating in 60 parts by weight of water, and the resultant solution was heated to 45° C., adjusted to pH 6.5, mixed with one unit/g reducing partial starch hydrolysate of a non-reducing saccharide-forming enzyme prepared by the method in Experiment 1-1, and incubated for 96 hours, followed by heating the resultant mixture at 100° C. for 10 min to inactivate the remaining enzyme. The solution thus obtained was diluted to give a concentration of about 20%, d.s.b., mixed with 10 units/g reducing partial starch hydrolysate of "GLUCOZYME", a glucoamylase specimen commercialized by Nagase Biochemicals, Ltd., Kyoto, Japan, and incubated for 40 hours, followed by heating the resultant mixture to inactivate the remaining enzyme. The solution thus obtained was in usual manner decolored with activated charcoal, desalted with ion-exchange resins, and concentrated into an about 60% solution containing 29.5% trehalose, d.s.b. The concentrated solution was fed to a jacketed-stainless steel column packed with "CG 6000, Na-form", a strong acidic cation exchange resin commercialized by Japan Organo, Co., Ltd., Tokyo, Japan, and fractionated at 60° C. and SV (space velocity) 0.4, followed by recovering a high trehalose content fraction containing about 90% trehalose, d.s.b. The fraction was concentrated into an about 75% w/w % solution, which was then transferred to a crystallizer, mixed with an about 2% hydrous crystalline trehalose as seed crystal, heated to 50°

EXPERIMENT 5

Preparation of Crystalline Trehalose Powder

A massecuite with a crystallinity of about 45% was prepared by the method in Experiment 1-2, and sprayed from a nozzle equipped on the top of a drying tower at a pressure of 150 kg/cm$^2$. In the spraying step, the contents were blown with 85° C. hot air from the upper part of the drying tower, and the resultant crystalline powder was collected on a wire netting conveyer provided in the basement of the drying tower, and recovered while blowing with 45° C. hot air sending from through under the wire netting conveyer and gradually conveying from the drying tower. The resultant crystalline powder was injected to an aging tower and aged for 10 hours while blowing with hot air to complete the crystallization and drying, followed by recovering the resultant crystalline trehalose powder.

EXPERIMENT 6

Preparation of Anhydrous Crystalline Trehalose Powder

The syrup containing trehalose, obtained in the process of Experiment 1-2, was prepared into an about 60% solution which was then subjected to column chromatography using a strong acidic cation exchange resin in accordance with the method in Experiment 1-2 to recover a high trehalose content fraction containing about 95% trehalose, d.s.b. In accordance with the method in Japanese Patent Application No. 265,416/93, the fraction was placed in a vessel and boiled up in vacuo into a syrup with a moisture content of about 4.0% which was then transferred to a crystallizer, mixed with one % anhydrous crystalline trehalose as seed crystal to the syrup, d.s.b., followed by crystallizing trehalose at 95° C. for 5 min under stirring conditions. The resultant was transferred to an aluminum container and aged at 100° C. for 6 hours to form block which was then pulverized by a cutter and dried by a fluidized-bed dryer to obtain an anhydrous crystalline trehalose powder with a moisture content of about 0.3%.

EXPERIMENT 7

Digestion Test In Vitro

By using a trehalose solution of a high-purity hydrous crystalline trehalose prepared by the method in Experiment 1-2, a digestion test of trehalose was carried out in vitro in accordance with the method as reported by K. Okada et al. in *JOURNAL OF JAPANESE SOCIETY OF NUTRITION AND FOOD SCIENCE*, Vol.43, No.1, pp.23–29 (1990). The digestibility of trehalose was evaluated based on the decomposition rate (%) calculated by the following equation:

$$\text{Decomposition rate (\%)} = \frac{\text{Reducing sugar}}{\text{Total sugar}} \times 100$$

The results were tabulated in Table 4.

TABLE 4

| Enzyme | Decomposition rate (%) |
| --- | --- |
| Salivary amylase | 0.0 |
| Gastric acid | 0.0 |
| Pancreatic amylase | 0.0 |
| Enzyme derived from rat small intestinal mucous membrane | 1.3 |

As evident from the results in Table 4, trehalose was not substantially hydrolyzed by the enzyme derived from rat small intestinal mucous membrane. By using the rat enzyme, disaccharides were tested for their digestibility similarly as above.

The results were tabulated in Table 5.

TABLE 5

| Disaccharide | Decomposition rate (%) |
| --- | --- |
| Maltose | 80.1 |
| Sucrose | 25.1 |
| Isomaltose | 13.2 |
| Lactose | 9.7 |
| Cellobiose | 1.2 |
| Trehalose | 1.3 |

As evident from the results in Table 5, trehalose was by far less hydrolyzed by the rat enzyme than maltose.

EXPERIMENT 8

Utilization Test In Vivo by Oral Administration

Figure 2:
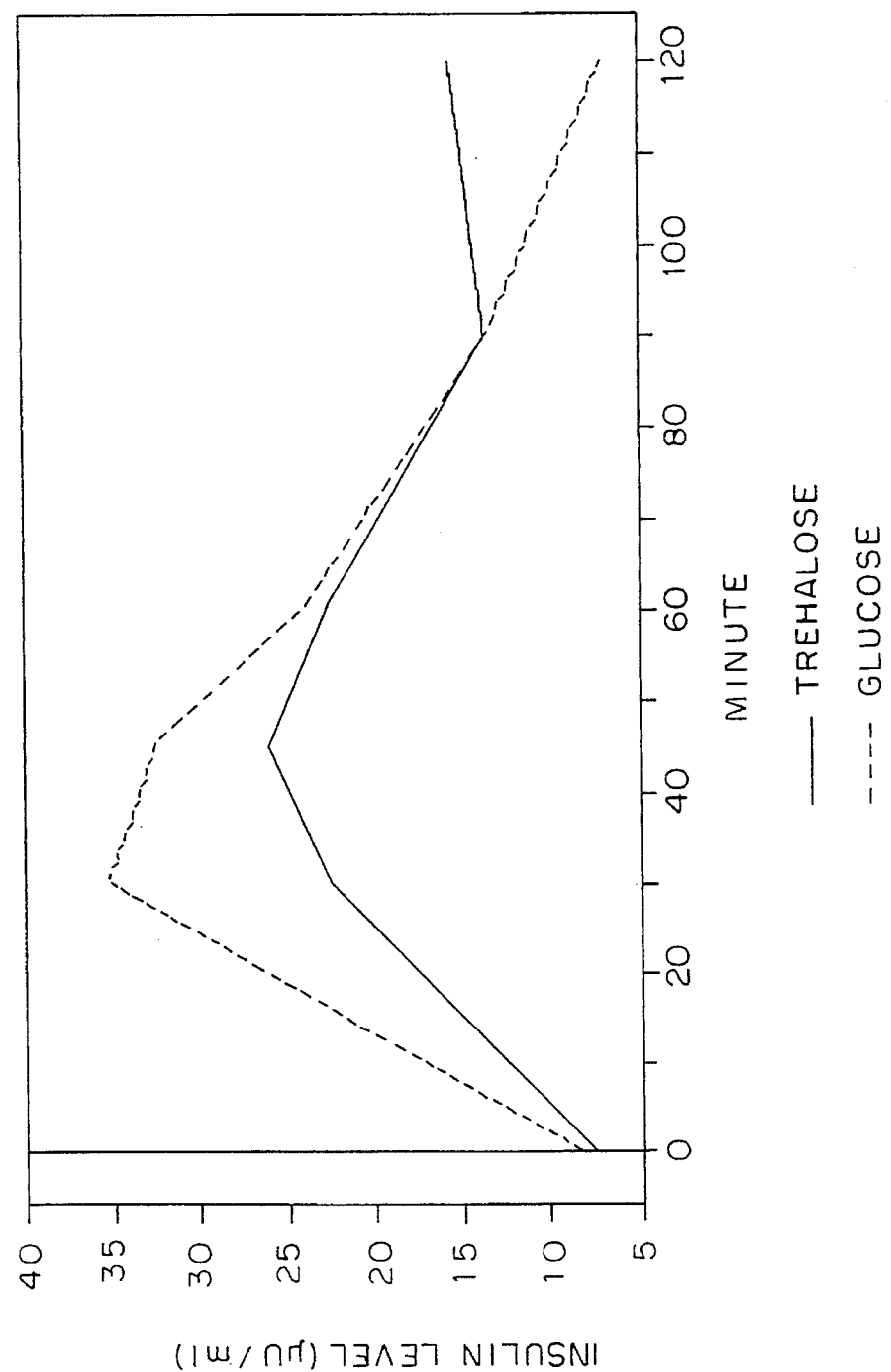
FIG. 2 shows the time course for insulin level as found in human volunteers who received an oral administration of trehalose or glucose.

In accordance with the method reported by H. Atsuji et al. in *Journal of Clinical Nutrition*, Vol.41, No.2, pp.200–208 (1972), 30 g of a hydrous crystalline trehalose prepared by the method in Experiment 1-2 was dissolved in water into a 20 w/v % aqueous trehalose solution, and prescribed amounts of which were orally administered to 6 male volunteers, 26–31-year-old. The volunteers were let blood at a prescribed time interval, and each blood sample was measured its blood sugar level, i.e. glucose concentration (mg/dl) and insulin level (μU/ml). As a control, glucose was used. The results of both levels were the mean values of 6 volunteers. FIGS. 1 and 2 show the time courses of blood sugar- and insulin-levels, respectively. In the figures, the solid- and dashed-lines mean the time courses of trehalose and insulin, respectively.

As evident from the results in FIGS. 1 and 2, although the dynamics of the rabbits administered with trehalose tended to show a time lag against those of the rabbits with glucose, the rabbits with trehalose showed the similar dynamics as those with glucose, namely trehalose induced the maxima of blood sugar- and insulin-levels at about 30–45 min after the administration. Unlike the results of digestion test in-vitro in Experiment 7, the results in this Experiment revealed that trehalose is readily assimilated, metabolized and utilized by living bodies as energy source when orally administered.

EXPERIMENT 9

Utilization Test In Vivo by Parenteral Administration

EXPERIMENT 9-1

Rapid Administration

A hydrous crystalline trehalose prepared by the method in Experiment 1-2 was dissolved in a refined water, and the resultant solution was membrane filtered, concentrated and recrystallized to obtain a pyrogen-free hydrous crystalline trehalose. The crystal thus obtained was dissolved in injectable distilled water into a 10 w/v % solution isotonic to rabbit blood as trehalose infusion. By using 6 rabbits, about 2–3 kg weight, the infusion was rapidly administered to their ear veins at a dose of one g/kg body weight within 1.5 min, followed by collecting their blood at a prescribed time interval, and subjecting the collected blood samples to the measurements of their sugar levels (glucose concentration (mg/dl)) and insulin levels (μU/ml). As a control, 5 w/v % glucose solution isotonic to rabbit blood was similarly administered to rabbit veins at a dose of 0.5 g/kg body weight. Each result was expressed by the mean value of the 6 rabbits, and the time courses of the blood sugar- and insulin-levels of the rabbits were respectively shown in FIGS. 3 and 4. In the figures, the solid- and dashed-lines mean the time courses of trehalose and insulin in rabbit blood, respectively.

Figure 3:
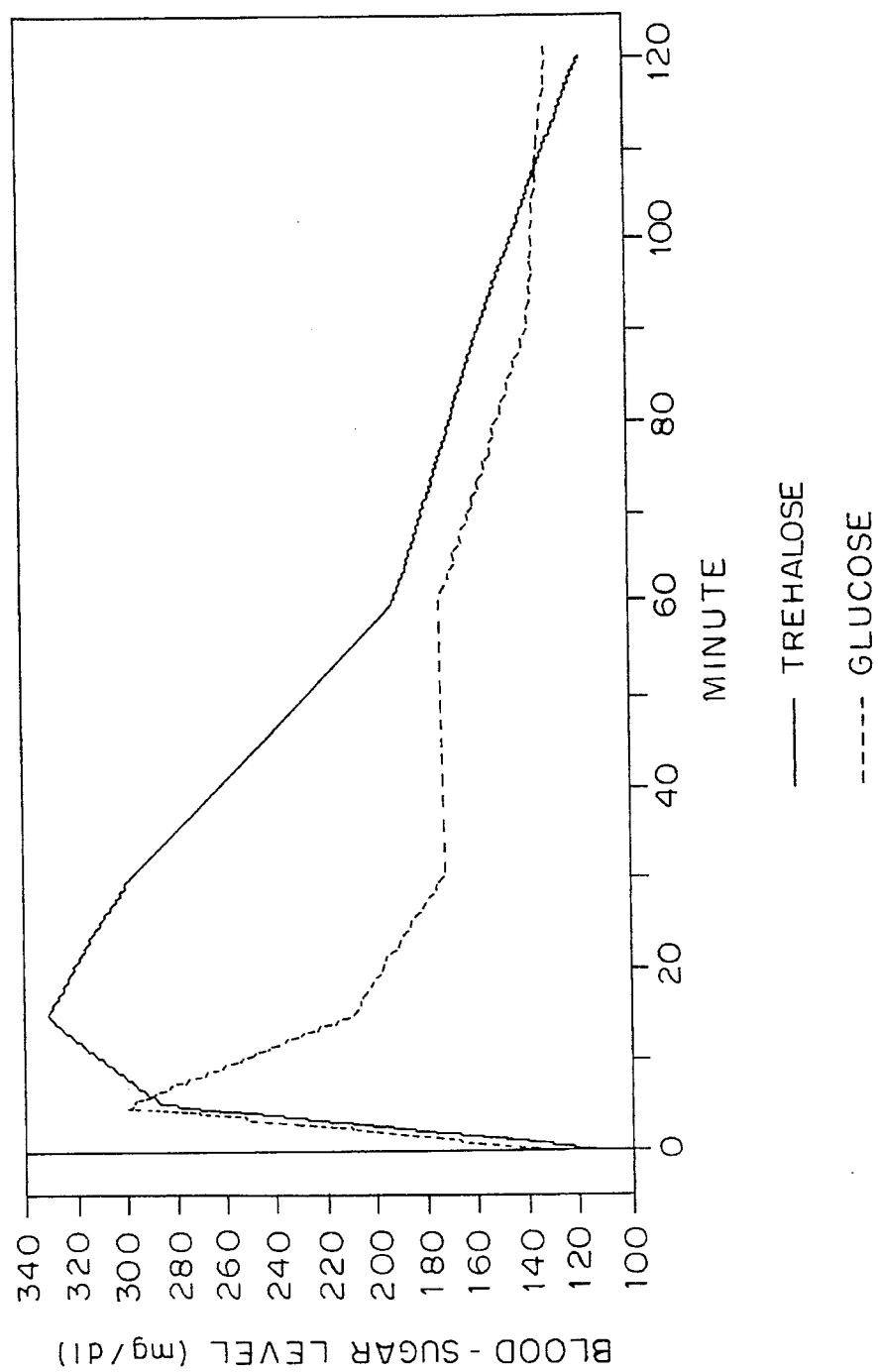
FIG. 3 shows the time course for blood-sugar level as found in rabbit which received a rapid parenteral administration of trehalose or glucose.
Figure 4:
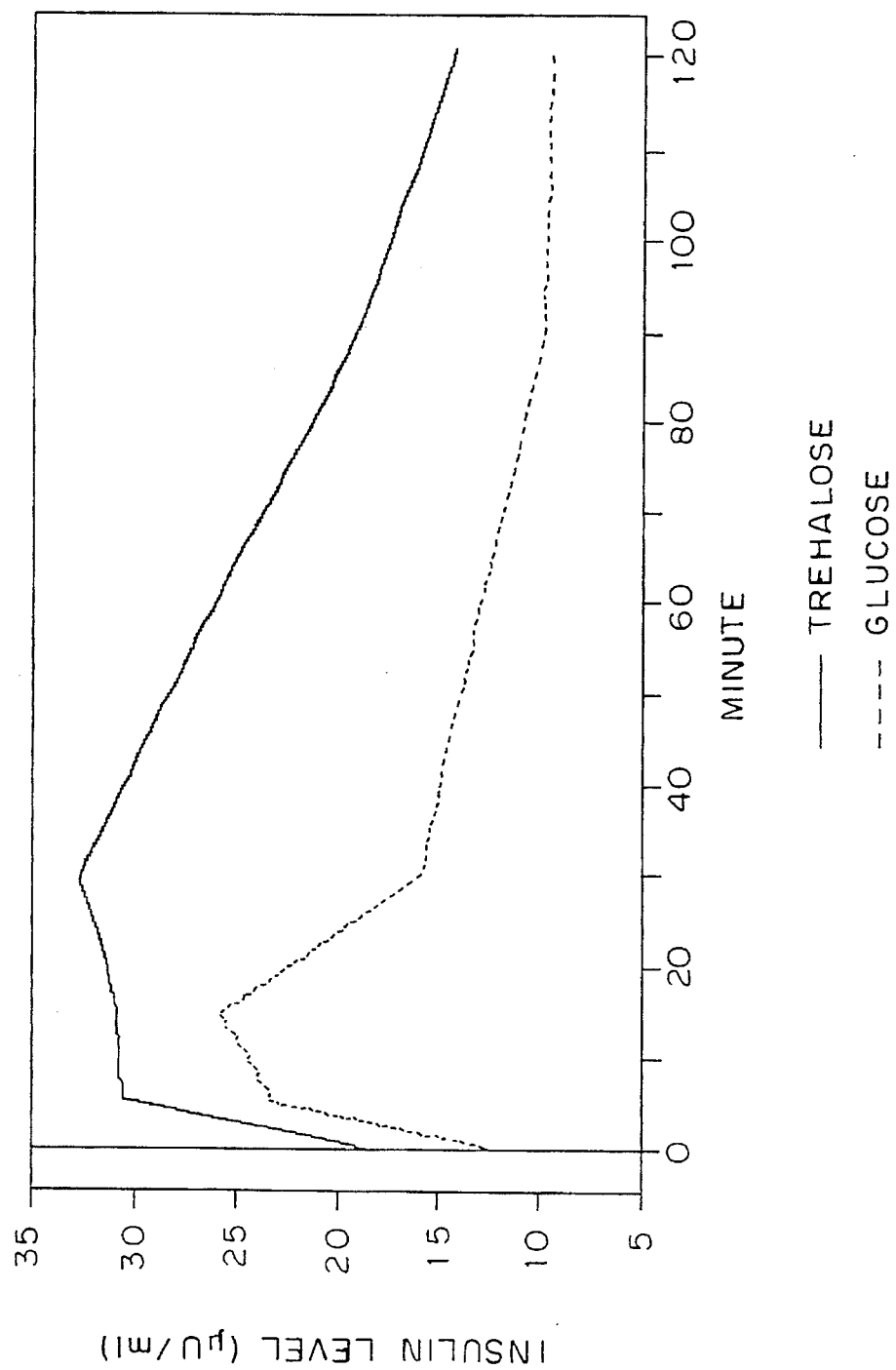
FIG. 4 shows the time course for insulin level as found in rabbit which received a rapid parenteral administration of trehalose or glucose.

As evident from the results in FIGS. 3 and 4, both the dynamics of blood sugar- and insulin-levels of the rabbits administered with trehalose tended to show a time lag against those of the rabbits with glucose, namely the maxima were found about 5–30 min after their administrations. These results revealed that when trehalose is parenterally administered rapidly it is readily hydrolyzed into glucose in vivo, metabolized and utilized by living bodies as energy source. The amounts of saccharides in urine secreted by the rabbits were monitored from the initiation of the administrations to 6 hours after the administrations, and the results revealed that the amount of trehalose secreted in rabbit urine was absolutely low similarly as in the case of glucose, i.e. the amount was lower than 10% of the administered trehalose, d.s.b.

EXPERIMENT 9-2

Slow Administration

A trehalose infusion prepared by the method in Experiment 9-1 was administered to 6 rabbits, about 2–3 kg weight, and collected their blood at a prescribed time interval, and the collected blood samples were measured their blood-sugar levels (glucose concentration (mg/dl)) and insulin levels (μU/ml) similarly as the method in Experiment 9-1 except that the infusion was slowly administered to the rabbit ear veins over a period of 1.5 hours. Each result was expressed by the mean value of the 6 rabbits, and the time courses of the blood sugar- and insulin-levels of the rabbits were respectively shown in FIGS. 5 and 6.

Figure 5:
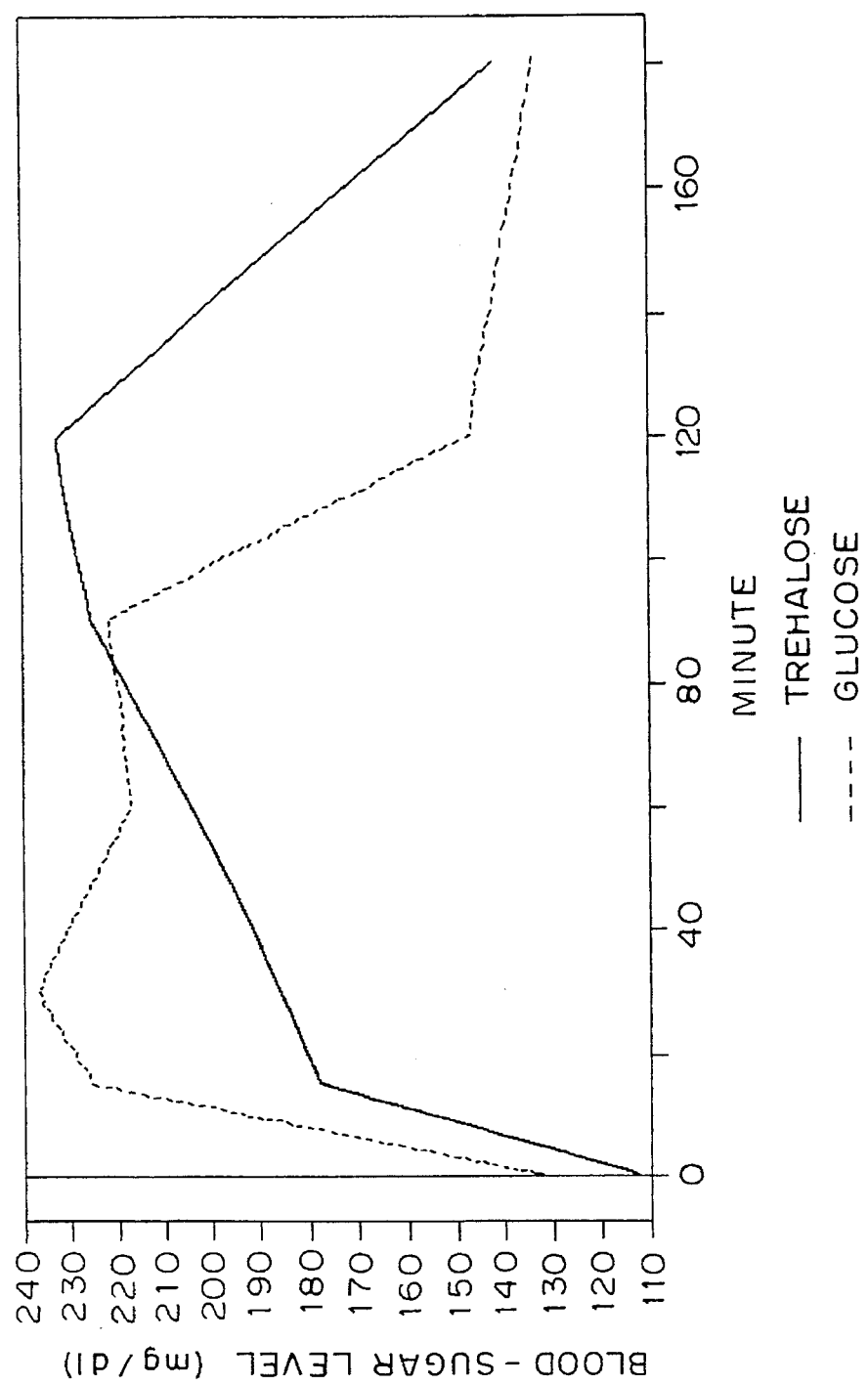
FIG. 5 shows the time course for blood-sugar level as found in rabbit which received a slow parenteral administration of trehalose or glucose.

As evident from the results in FIGS. 5 and 6, although the dynamics of blood-sugar level of the rabbits administered with trehalose tended to show a time lag against those of the rabbits with glucose, both the dynamics were substantially the same, and the dynamics of insulin level of the rabbits with trehalose were substantially the same as those with glucose. These results revealed that when trehalose is parenterally administered slowly to living bodies, it is readily hydrolyzed into glucose in vivo, metabolized and utilized by the living bodies as energy source. The amounts of saccharides secreted in the rabbit urine were monitored from the initiation of the administrations to 6 hours after the administrations, and the results revealed that the amount of trehalose secreted in each urine was absolutely low similarly as in the case of glucose, i.e. the amount was lower than 10% of the administered trehalose, d.s.b.

EXPERIMENT 10

Acute Toxicity Test

By using mice, trehalose was tested for its acute toxicity by orally administering it to the mice a hydrous crystalline trehalose prepared by the method in Experiment 1-2. As a result, it was revealed that trehalose is a substance having a relatively-low toxicity, and no mouse died even when administered with the highest possible dose. Based on the result, the $LD_{50}$ was 50 g/kg or higher, though the value was not so accurate.

The following examples explain the present energy-supplementing composition containing trehalose as effective ingredient:

EXAMPLE 1

Chocolate

Forty parts by weight of cacao paste, 10 parts by weight of cacao butter, and 50 parts by weight of a hydrous crystalline trehalose prepared by the method in Experiment 1-2 were mixed, and the resultant mixture was passed through a refiner to reduce the particle size, transferred to a conche, and kneaded at 50° C. for 2 days. During this kneading step, 0.5 parts by weight of lecithin was added to the contents, and the resultant mixture was sufficiently kneaded. Thereafter, the mixture was kept at 31° C. by a thermoregulator, poured into a mold before the solidification of cacao butter, deaerated with a vibrator, and solidified while passing through a cooling tunnel at 10° C. for 20 min. The solidified contents were removed from the mold and packaged to obtain the desired product.

The product substantially free of hygroscopicity has a satisfiable color, gloss and texture, and mildly melts in the mouth to exert a high-quality sweetness and flavor, and these render it arbitrarily useful as energy-supplementing composition.

EXAMPLE 2

Chewing Gum

Three parts by weight of a gum base was melted by heating until it softened, mixed with 4 parts by weight of sucrose and 3 parts by weight of a crystalline trehalose powder prepared by the method in Experiment 1-3, and further mixed with adequate amounts of a flavor and a coloring agent. The resultant mixture was in usual manner kneaded by a roll, formed and packaged to obtain the desired product.

The product, a chewing gum with a satisfiable texture and flavor, can be arbitrarily used as energy-supplementing composition.

EXAMPLE 3

Hard Candy

One hundred parts by weight of a 55% sucrose solution was mixed while heating with 30 parts by weight of a high trehalose content solution prepared by the method in Experiment 6, and the resultant mixture was concentrated in vacuo under heating conditions up to give a moisture content of lower than 2%. The concentrate was admixed with one part by weight of citric acid and adequate amounts of a lemon flavor and a coloring agent, and the mixture was formed in usual manner to obtain the desired product.

The product, wherein the crystallization of sucrose is well inhibited, is a high-quality hard candy having a satisfiable taste and biting property, and suitably used as energy-supplementing composition.

EXAMPLE 4

Custard Cream

One hundred parts by weight of corn starch, 100 parts by weight of a trehalose syrup containing 70% of a crystalline trehalose powder, d.s.b., prepared by the method in Experiment 1-3, 80 parts by weight of maltose, 20 parts by weight of sucrose, and one part by weight of salt were sufficiently kneaded, and the mixture was further admixed with 280 parts by weight of fresh egg while stirring, and gradually mixed with 1,000 parts by weight of a boiling milk. The resultant mixture was continued stirring while heating, and the heating was suspended when the whole contents became semitransparent, followed by cooling the resultant and adding thereto an adequate amount of a vanilla flavor. The product was weighed, injected into a container and packaged to obtain the desired product.

The product has a smooth surface and a mild sweetness and taste, and these render it arbitrarily useful as energy-supplementing composition.

EXAMPLE 5

Uiro-No-Moto (Premix of Uiro)

A uiro-no-moto was prepared by sufficiently mixing 90 parts by weight of rice powder with 20 parts by weight of corn starch, 120 parts by weight of a crystalline trehalose powder prepared by the method in Experiment 1-3, and 4 parts by weight of pullulan. The product was kneaded with adequate amounts of matcha (powdered green tea) and water, and the mixture was placed in a container and steamed up for 60 min to obtain a matcha-uiro.

The product has a satisfiable gloss, biting property and flavor. The retrogradation of starch in the product is well inhibited, and this attains a satisfiable shelf-life. The product can be arbitrarily used as energy-supplementing composition.

EXAMPLE 6

Lactic Acid Beverage

Ten parts by weight of defatted milk was sterilized by heating at 80° C. for 20 min, cooled to 40° C., mixed with 0.3 parts by weight of a starter, and fermented at about 37° C. for 10 hours. Thereafter, the mixture was homogenized and mixed with 4 parts by weight of a crystalline trehalose powder prepared by the method in Experiment 1-3, one part by weight of sucrose, and 2 parts by weight of isomerized syrup, and the resultant mixture was sterilized by heating at 70° C. The product thus obtained was cooled, mixed with an adequate amount of a flavor, and bottled to obtain the desired product.

The product, a high-quality lactic acid beverage with a well harmonized flavor and sweetness, can be arbitrarily used as energy-supplementing composition.

EXAMPLE 7

Powdered Juice

Thirty-three parts by weight of a powdered orange juice prepared by spray-drying was mixed to homogeneity while stirring with 50 parts by weight of a hydrous crystalline trehalose powder prepared by the method in Experiment 1-2, 10 parts by weight of sucrose, 0.65 parts by weight of anhydrous citric acid, 0.1 part by weight of malate, 0.1 part by weight of L-ascorbic acid, 0.1 part by weight of sodium citrate, 0.5 parts by weight of pullulan, and an adequate amount of a powdered flavor. The mixture was pulverized, fed to a fluidized-bed granulator wherein the exhaust temperature and flow rate were respectively adjusted to 40° C. and 150 m$^3$/min, sprayed with a high trehalose content solution, as binder, prepared with a commercially available trehalose, and granulated for 30 min. The resultant granules in powder were weighed and packaged to obtain the desired product.

The product, a 30% powdered juice, d.s.b., is stable for a relatively-long period of time without giving an unfavorable taste and smell and causing solidification by absorbing moisture. Thus, the product can be arbitrarily used as energy-supplementing composition.

EXAMPLE 8

Powdered Egg Yolk

Egg yolks prepared from fresh eggs were sterilized by a plate heater at 60°–64° C., and one part by weight of the resultant liquid was mixed with 4 parts by weight of an anhydrous crystalline trehalose prepared by the method in Experiment 6. The resultant mixture was placed in a container and allowed to stand overnight to form a block while allowing trehalose to convert into hydrous crystalline trehalose. The block was pulverized by a cutter to obtain a powdered egg yolk.

The product can be arbitrarily used as material for confectioneries such as premix, ice cream and candy, and emulsifier, as well as energy-supplementing composition for oral and intubation feedings.

EXAMPLE 9

Solid Preparation for Intubation Feeding

A composition consisting of the following compositions was prepared: Five hundred parts by weight of hydrous crystalline trehalose prepared by the method in Experiment 1-2, 270 parts by weight of powdered egg yolk, 209 parts by weight of defatted milk, 4.4 parts by weight of sodium chloride, 1.8 parts by weight of potassium chloride, 4 parts by weight of magnesium sulfate, 0.01 part by weight of thiamine, 0.1 part by weight of sodium ascorbate, 0.6 parts by weight of vitamin E acetate, and 0.04 parts by weight of nicotinamide. Twenty-five g aliquots of the composition were injected into moisture-proof laminated small bags and heat sealed to obtain the desired product.

One bag of the product is dissolved in about 150–300 ml of water into a fluid food, and orally administered or parenterally administered to nasal cavity, stomach and intestines by intubation feeding as energy-supplementing composition.

EXAMPLE 10

Hyperalimentation

A hydrous crystalline trehalose powder, prepared by the method in Experiment 1-2, was dissolved in water into an about 10 w/v % aqueous trehalose solution which was then in usual manner membrane filtered to remove pyrogen, aseptically injected into a plastic bottle, and sealed to obtain the desired product.

The product, a satisfactorily stable hyperalimentation substantially free of change on standing, is suitable for intravenous- and intraperitoneal-administrations. A 10 w/v % solution of the product is isotonic to blood, and this means it supplements energy to living bodies at 2-fold higher concentration than in the case of glucose.

EXAMPLE 11

Hyperalimentation

A hydrous crystalline trehalose, prepared by the method in Experiment 1-2, and an amino acid composition consisting of the following components were dissolved by stirring in water to give 5 w/v % and 30 w/v %, respectively, and, similarly as in Example 10 the resultant solution was purified into a pyrogen-free solution which was then injected into a plastic bottle and sealed to obtain the desired product.

| Components of amino acid composition | |
| --- | --- |
| Component | mg/100 ml |
| L-Isoleucine | 180 |
| L-Leucine | 410 |
| L-Lysine monohydrochloride | 620 |
| L-Methionine | 240 |
| L-Phenyl alanine | 290 |
| L-Threonine | 180 |
| L-Tryptophane | 60 |
| L-Valine | 200 |
| L-Arginine hydrochloride | 270 |
| L-Histidine monohydrochloride | 130 |
| Glycine | 340 |

Although the product is a multiple hyperalimentation of trehalose and amino acids, it is satisfactorily stable without substantial change on standing and can be suitably administered intravenously and intraperitoneally to living bodies. The product can be favorably used as energy-supplementing composition to supplement energy as well as amino acids.

EXAMPLE 12

Traumatic Ointment

Five hundred parts by weight of a crystalline trehalose powder, prepared by the method in Experiment 1-3, was admixed with 50 parts by weight of methanol solution containing 3 parts by weight of iodine, and the resultant solution was mixed with 200 parts by weight of a 10 w/v % aqueous pullulan solution to obtain a traumatic ointment having a satisfiable extensibility and adhesiveness.

The iodine contained in the product exerts a bactericidal activity, and the trehalose in the product acts as energy-supplementing saccharide source on viable cells, and because of these the product shortens a healing period and satisfactorily heals a wound surface.

EXAMPLE 13

Sugar Coated Tablet

A crude tablet, 150 mg weight, as core, was coated until it weighed about 230 mg, d.s.b., with a solution consisting of 40 parts by weight of a hydrous crystalline trehalose prepared by the method in Experiment 1-2, 2 parts by weight of pullulan having an average molecular weight of 200,000, 30 parts by weight of water, 25 parts by weight of talc, and 3 parts by weight of titanium oxide. The resultant tablet was further coated with 65 parts by weight of a fresh preparation of the same hydrous crystalline trehalose, one part by weight of pullulan, and 34 parts by weight of water. The tablet thus obtained was glossed with a wax solution to obtain the desired product with a satisfiable appearance.

The product, which is readily preparable by the above-mentioned coating step, has a relatively-high shock-tolerance, and retains its high quality for a relatively-long period of time. Thus, it can be suitably used as energy-supplementing composition.

As evident from above, the present energy-supplementing saccharide source essentially consisting of trehalose, prepared by the method containing a step of allowing a non-reducing saccharide-forming enzyme to act on a reducing partial starch hydrolysate, has a satisfiable stability without substantially exhibiting a reducing power, as well as possessing a character of being readily metabolized in vivo and utilized by living bodies as energy source. Furthermore, the present energy-supplementing composition, containing as effective ingredient trehalose prepared from reducing partial starch hydrolysates by a novel biochemical technique, has a character that it can be readily prepared into more satisfiable multiple nutritive compositions in combination with other nutritives and medicaments, as well as into pharmaceutical compositions with an increased therapeutic efficacy.

While there has been described what is at present considered to be the preferred embodiments of the invention, it will be understood the various modifications may be made therein, and it is intended to cover in the appended claims all such modifications as fall within the true spirits and scope of the invention.

We claim:

1. An energy-supplementing saccharide source which contains as an effective ingredient α,α-trehalose in an amount of at least 50 w/w % against the total weight, on a dry solid basis, said α,α-trehalose being enzymatically prepared by
    (a) allowing a non-reducing saccharide-forming enzyme to act on a solution of a partial starch hydrolysate which exhibits a reducing power and has a degree of glucose polymerization (DP) of 3–25 to form a saccharide solution containing α,α-trehalose;
    (b) purifying the resultant saccharide solution to increase the purity of α,α-trehalose; and
    (c) recovering the purified α,α-trehalose.

2. The energy-supplementing saccharide source in accordance with claim 1, wherein the step (b) contains a step of feeding the resultant saccharide solution to column chromatography using a strong-acid cation exchange resin.

3. The energy-supplementing saccharide source in accordance with claim 1, wherein said saccharide solution contains 20–80 w/v % trehalose.

4. The energy-supplementing saccharide source in accordance with claim 1, which is directed to an oral or parenteral administration.

5. The energy-supplementing saccharide source in accordance with claim 1, wherein said non-reducing saccharide-forming enzyme has the following physicochemical properties:
    (1) Action
        Forming non-reducing saccharides having a trehalose structure as end unit when allowed to act on one or more reducing partial starch hydrolysates having a degree of glucose polymerization (DP) of 3 to 25;
    (2) Molecular weight
        About 76,000–87,000 daltons on sodium dodecylsulfate-polyacrylamide gel electrophoresis (SDS-PAGE);
    (3) Isoelectric point (pI)
        About 3.6–4.6 on isoelectrophoresis using ampholyte;
    (4) Optimum temperature
        About 35°–40° C. when incubated at pH 7.0 for 60 min;
    (5) Optimum pH
        About 6.4–7.2 when incubated at 40° C. for 60 min;
    (6) Thermal stability
        Stable up to a temperature of about 35°–40° C. when incubated at pH 7.0 for 60 min; and
    (7) pH Stability
        Stable at a pH in the range of about 5.5–11.0 when incubated at 25° C. for 16 hours.

6. The energy-supplementing saccharide source in accordance with claim 1, wherein the enzymatic reaction in the step (a) is carried out at a temperature up to about 55° C. and a pH of 5–10.

7. The energy-supplementing saccharide source in accordance with claim 1, wherein the solution in the step (a) contains at least 2 w/v % of a partial starch hydrolysate.

8. An energy-supplementing composition containing a saccharide as an effective ingredient and a carrier, wherein said saccharide consists essentially of α,α-trehalose enzymatically prepared by allowing a non-reducing saccharide-forming enzyme to act on a solution of a partial starch hydrolysate which exhibits a reducing power and has a degree of glucose polymerization (DP) of 3–25 to form a saccharide solution containing α,α-trehalose; purifying the resultant saccharide solution to increase the purity of α,α-trehalose; and recovering the purified α,α-trehalose, said composition containing at least 10 w/w % of said α,α-trehalose against the total weight of the composition, on a dry solid basis.

9. The energy-supplementing composition in accordance with claim 8, which is directed to an oral or parenteral administration.

10. A process to prepare the energy-supplementing saccharide source of claim 1, which comprises:
  (a) allowing a non-reducing saccharide-forming enzyme to act on a solution of a partial starch hydrolysate which exhibits a reducing power and has a degree of glucose polymerization (DP) of 3–25 to form a saccharide solution containing trehalose;
  (b) purifying the resultant saccharide solution to increase the purity of trehalose; and
  (c) recovering the purified trehalose.

11. The process in accordance with claim 10, wherein the step (b) contains a step of feeding the saccharide solution to column chromatography using a strong-acid cation exchange resin.

12. The process in accordance with claim 10, wherein the saccharide solution in the step (a) contains 20–80 w/v % trehalose.

13. The process in accordance with claim 10, wherein said non-reducing saccharide-forming enzyme has the following physicochemical properties:
  (1) Action
    Forming non-reducing saccharides having a trehalose structure as end unit when allowed to act on one or more reducing partial starch hydrolysates having a degree of glucose polymerization (DP) of 3 to 25;
  (2) Molecular weight
    About 76,000–87,000 daltons on sodium dodecylsulfate-polyacrylamide gel electrophoresis (SDS-PAGE);
  (3) Isoelectric point (pI)
    About 3.6–4.6 on isoelectrophoresis using ampholyte;
  (4) Optimum temperature
    About 35°–40° C. when incubated at pH 7.0 for 60 min;
  (5) Optimum pH
    About 6.4–7.2 when incubated at 40° C. for 60 min;
  (6) Thermal stability
    Stable up to a temperature of about 35°–40° C. when incubated at pH 7.0 for 60 min; and
  (7) pH Stability
    Stable at a pH in the range of about 5.5–11.0 when incubated at 25° C. for 16 hours.

14. The process in accordance with claim 10, wherein the enzymatic reaction in the step (a) is carried out at a temperature up to about 55° C. and a pH of 5–10.

15. The process in accordance with claim 10, wherein the solution in the step (a) contains at least 2 w/v % of a partial starch hydrolysate.

16. A process for preparing the energy-supplementing composition of claim 8, which comprises:
  (a) allowing a non-reducing saccharide-forming enzyme to act on a partial starch hydrolysate which exhibits a reducing power and has a degree of glucose polymerization (DP) of 3–25 to form a saccharide solution containing trehalose;
  (b) purifying the resultant trehalose;
  (c) recovering the purified trehalose; and
  (d) incorporating the purified trehalose into a carrier, wherein said composition contains at least 10 w/w % α,α-trehalose against the total weight of the composition, on a dry solid basis.

17. The process in accordance with claim 16, wherein said composition is directed to an oral or parenteral administration.

18. The process in accordance with claim 16, wherein said non-reducing saccharide-forming enzyme has the following physicochemical properties:
  (1) Action
    Forming non-reducing saccharides having a trehalose structure as end unit when allowed to act on one or more reducing partial starch hydrolysates having a degree of glucose polymerization (DP) of 3 to 25;
  (2) Molecular weight
    About 76,000–87,000 daltons on sodium dodecylsulfate-polyacrylamide gel electrophoresis (SDS-PAGE);
  (3) Isoelectric point (pI)
    About 3.6–4.6 on isoelectrophoresis using ampholyte;
  (4) Optimum temperature
    About 35°–40° C. when incubated at pH 7.0 for 60 min;
  (5) Optimum pH
    About 6.4–7.2 when incubated at 40° C. for 60 min;
  (6) Thermal stability
    Stable up to a temperature of about 35°–40° C. when incubated at pH 7.0 for 60 min; and
  (7) pH Stability
    Stable at a pH in the range of about 5.5–11.0 when incubated at 25° C. for 16 hours.

19. The process in accordance with claim 16, wherein the enzymatic reaction in the step (a) is carried out at a temperature up to about 55° C. and a pH of 5–10.

20. The process in accordance with claim 16, wherein the solution in the step (a) contains at least 2 w/v % of a partial starch hydrolysate.

21. A method to supplement energy to a living body, which contains a step of administering the energy-supplementing saccharide source of claim 1 to said living body.

22. A method to supplement energy to a living body, comprising administering the energy-supplementing composition of claim 8 to said living body.

23. The energy-supplementing composition in accordance with claim 8 wherein said α,α-trehalose is in crystalline form.

24. The energy-supplementing composition in accordance with claim 8 wherein said α,α-trehalose is present in an amount of at least 80% of the total weight of the composition, on a dry solid basis.

25. The energy-supplementing composition in accordance with claim 8 wherein said α,α-trehalose is present in an amount of at least 90% of the total weight of the composition, on a dry solid basis.

* * * * *